(12) United States Patent
Oflaz

(10) Patent No.: US 7,343,787 B2
(45) Date of Patent: Mar. 18, 2008

(54) PIEZOELECTRIC TIRE SENSOR AND METHOD

(76) Inventor: Oguzhan Oflaz, 240 9th St., Suite 5, Jersey City, NJ (US) 07302

( * ) Notice: Subject to any disclaimer, the term of this patent is extended or adjusted under 35 U.S.C. 154(b) by 0 days.

(21) Appl. No.: 11/419,190

(22) Filed: May 18, 2006

(65) Prior Publication Data

US 2006/0260390 A1 Nov. 23, 2006

Related U.S. Application Data

(60) Provisional application No. 60/682,657, filed on May 19, 2005.

(51) Int. Cl.
*G01M 17/02* (2006.01)
(52) U.S. Cl. .................... 73/146; 340/442
(58) Field of Classification Search ....... 73/146–146.8; 340/442–447
See application file for complete search history.

(56) References Cited

U.S. PATENT DOCUMENTS

| 5,702,629 | A | 12/1997 | Cui et al. |
| 5,749,984 | A | 5/1998 | Frey et al. |
| 5,951,908 | A | 9/1999 | Cui et al. |
| 6,259,372 | B1 * | 7/2001 | Taranowski et al. ........ 340/683 |
| 6,262,517 | B1 | 7/2001 | Schmidt et al. |
| 6,629,341 | B2 | 10/2003 | Wilkie et al. |
| 6,725,713 | B2 | 4/2004 | Adamson et al. |
| 6,933,655 | B2 * | 8/2005 | Morrison et al. ........... 310/314 |
| 7,005,987 | B2 | 2/2006 | Sinnett et al. |
| 2005/0073222 | A1 | 4/2005 | Kampe et al. |

\* cited by examiner

*Primary Examiner*—Edward Lefkowitz
*Assistant Examiner*—Jermaine Jenkins
(74) *Attorney, Agent, or Firm*—Elias P. Soupos

(57) ABSTRACT

A tire monitor includes a first device (300) having at least one piezoelectric matrix element (404), and a first sensing layer (410) that includes at least one rectifier (106) and a processor element (110). The first device (300) is capable of sensing a deflection (u) in a layer of material, and is capable of processing the sensed deflection. The first device (300) is capable of wirelessly transmitting an indication (116) on a condition of the material.

17 Claims, 8 Drawing Sheets

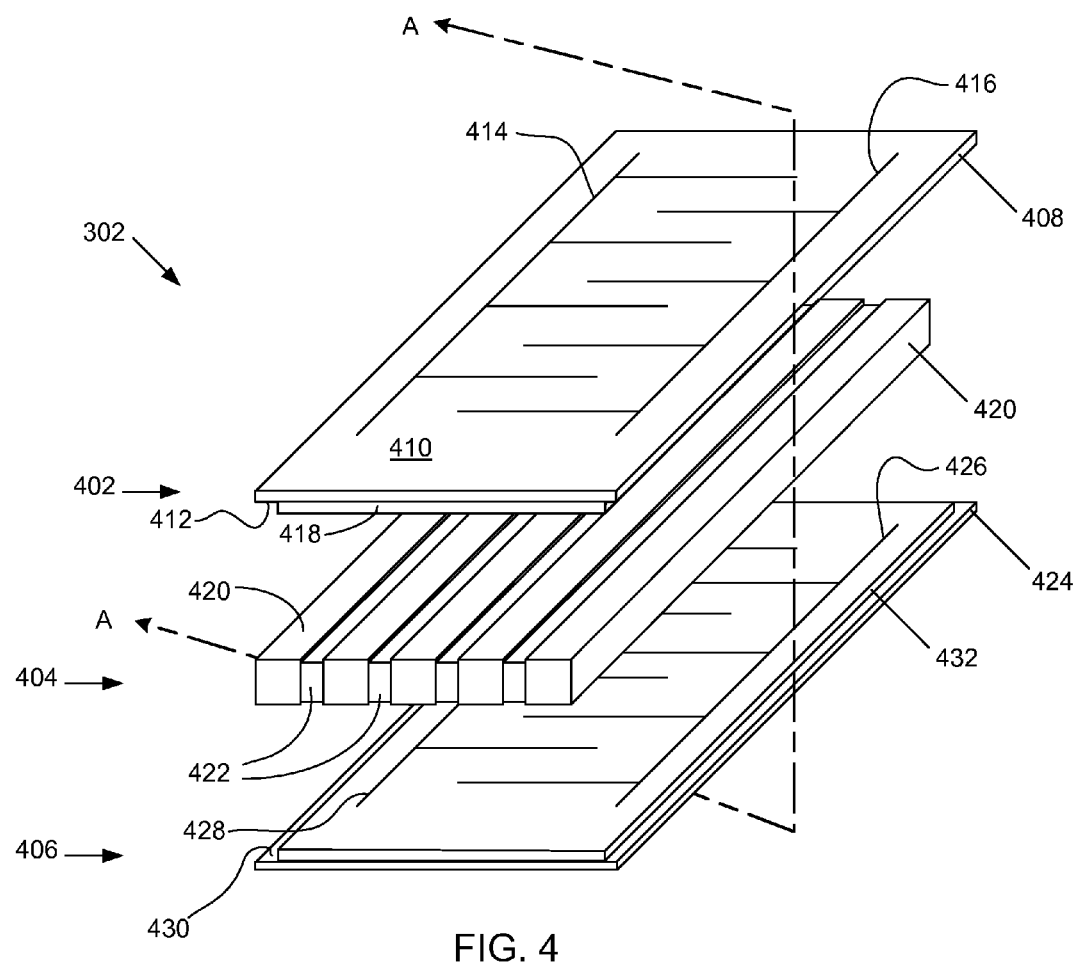
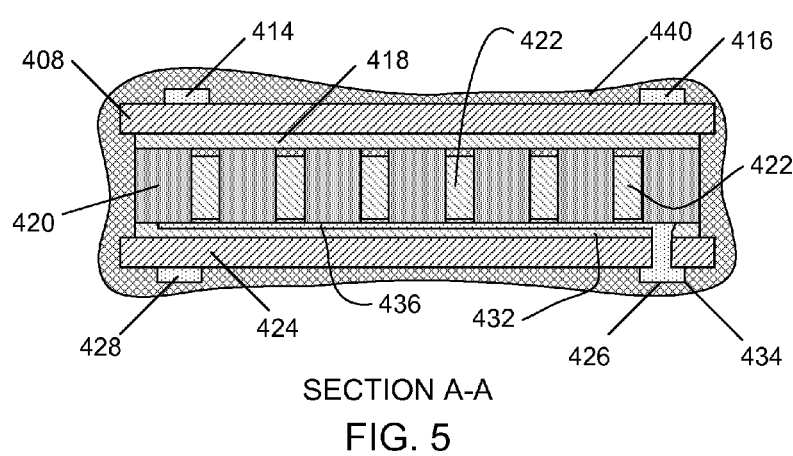
FIG. 4
SECTION A-A
FIG. 5

US 7,343,787 B2

PIEZOELECTRIC TIRE SENSOR AND METHOD

CLAIM OF PRIORITY

This application claims the benefit of the filing date of U.S. Provisional Application Ser. No. 60/682,657, filed May 19, 2005 on behalf of the same inventor as the present application.

FIELD OF THE INVENTION

This invention relates to pressure sensors, including but not limited to pressure sensors used for sensing tire pressure for vehicles.

BACKGROUND OF THE INVENTION

Pressure sensors that sense air pressure internal to a tire of a vehicle during operation are known. Current tire pressure sensor (TPS) technology is deficient in precision and accuracy, which makes them unreliable for use as a safety measure in automotive and aeronautical industry. Current TPS technology is heavily based on semiconductor devices such as surface acoustic wave devices (SAW), and the devices developed thereof are primarily mounted on the valve stem of a tire or on the rim of the wheel. Currently commercially available devices for sensing tire pressure are large and may often even affect critical factors such as tire balance, making balancing of the tires virtually impossible. Furthermore, such devices tend to become damaged during regular tire replacing, and are even prone to tampering, thereby necessitating the TPS to be replaced. This and other factors make current TPS cost prohibitive and complicated for many end users.

Moreover, most if not all TPS arranged to measure tire pressure during operation of a vehicle that are available today require an external power source for transmitting collected pressure data to a central processor. A power source connected to a sensor, in addition to the large size of sensors that are currently commercially available, make the implementation of tire pressure sensors inefficient from a cost and practicality of use standpoint. Furthermore, current TPS may be prone to vibration, temperature, and humidity, and typically provide low measurement precision and accuracy. Also, battery replacement for the sensors may not be feasible at all times during operation.

Accordingly, there is a need for a tire pressure sensor that is simple to implement, light weight, and has improved measurement precision and accuracy.

SUMMARY OF THE INVENTION

A tire pressure monitoring system is disclosed herein that solves many of the issues currently experienced by similar systems. The tire monitor includes a first device having at least one piezoelectric matrix element, and a first sensing layer that includes at least one rectifier and a processor element. The first device is capable of sensing a deflection in a layer of material, and is capable of processing the sensed deflection. The first device is then capable of wirelessly transmitting an indication on a condition of the material.

A method of monitoring a tire includes the step of generating a spike of voltage once during a rotation of a tire with a sensor attached to the tire. The spike of voltage may be detected by a processor that determines a magnitude thereof. The magnitude is compared to at least one of a warning threshold and a failure threshold within the processor, and a warning indication is sent when the magnitude exceeds the warning threshold.

A method of sensing an inflation condition of a tire includes the step of operably attaching at least one device on an inner periphery of a tire. The at least one device is capable of generating a voltage based on a flexural strain present in a section of material of the inner periphery of the tire. An indication of the inflation condition of the tire may be wirelessly transmitted externally to the at least one device by generating a spike voltage value based on the flexural strain, comparing a magnitude of the spike voltage to a nominal value, initiating a timer when the magnitude of the spike voltage exceeds the nominal value, and activating a wireless transmitter. A power storage device that is located on the at least one device may also be charged by electrical power generated in the spike voltage.

BRIEF DESCRIPTION OF THE DRAWINGS

FIG. 4 is an expanded view of the tire pressure measurement device in accordance with the invention.

FIG. 5 is a cross-sectional view along axis A-A of the tire pressure measurement device of FIG. 4.

DESCRIPTION OF A PREFERRED EMBODIMENT

The following describes an apparatus for and method of sensing air pressure of a tire attached to a vehicle during operation. One embodiment may advantageously be arranged to measure a pressure in a tire of many types of vehicles, including but not limited to passenger automobiles, buses, trailers, and commercial trucks of any size or weight classification, and so forth, and may even be implemented on tires used on other applications, for example, tires used on landing gear of aircraft, tires attached to cranes, trailers, or other machines. In a method of sensing pressure in a tire of a vehicle, an error discrimination method may be used to improve pressure information acquired from a single sensor or a plurality of tire pressure sensors. Moreover, in another method for sensing pressure in a tire of a vehicle, a weight of the vehicle may be determined for loading or highway commercial traffic weight regulation purposes. Such multi-functionality may be used to eliminate the need for additional speed and/or rollover sensors, advantageously reducing the cost associated with an overall safety system of a vehicle.

Signals acquired from one or more pressure sensors may be collected and or processed in an electronic module attached to a vehicle, or alternatively, an electronic module remotely in communication with the sensors of the vehicle. Information on the loading of the vehicle and/or an operational status of one or more tires, in addition to information about a structural condition of a pavement or ground surface, may be processed in an electronic controller and sent to an operator of the vehicle and/or transmitted to a remote location.

Figure 1:
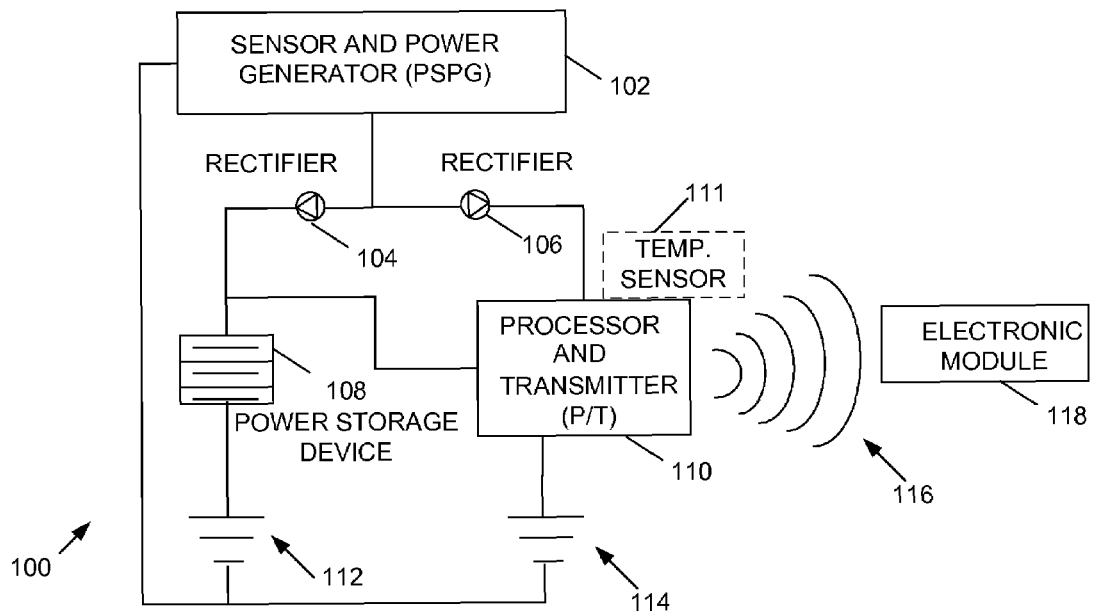
FIG. 1 is a block diagram of a tire pressure measurement system in accordance with the invention.

A tire pressure monitoring system (TPMS) 100 is shown in FIG. 1. The TPMS 100 includes a pressure sensor and power generator (PSPG) device 102. The PSPG device 102 may be connected to one or more rectifiers 104 and 106. The rectifier 104 may be used for signal conditioning, and may be connected to a power storage device such as a rechargeable battery or a capacitor 108. The power storage device 108 is optional. The rectifier 104 may also be connected to a signal processor/transmitter (P/T) device 110. The PSPG may be used to produce a sensor signal, as will be discussed further, and may also be used to advantageously generate electrical power to charge the power storage device 108 if one is used. Each of the power storage device 108 and the P/T device 110, along with the PSPG 102 may all be connected to one or more electrical "grounds" 112 and 114. The P/T device 110 may also include a temperature sensor 111 incorporated therewith. The temperature sensor 111 may be external to the P/T 110 or alternatively may be incorporated therein. The temperature sensor 111 is optional because, for example, the P/T 110 may be arranged to receive temperature information from an external source on a vehicle. The temperature sensor 111 may advantageously measure an ambient temperature around the TPMS 100 during service, for example, the temperature inside the tire. The P/T 110 may use temperature data collected for temperature compensation and/or correction of collected pressure data by the TPMS 100.

The P/T device 110 used on the TPMS 100 may be arranged to transmit information wirelessly through a plurality of electromagnetic waves 116 to an electronic module 118. The module 118 may be arranged to receive the waves 116. The electronic module 118 may be connected to a vehicle, or may alternatively be remotely situated and arranged to relay information sent from the P/T device 110 to an operator (not shown) of a vehicle. The TPMS 100 may transmit the information contained in the waves 116 to the vehicle electronic control unit (ECU), which may be a stand-alone module in communication with the electronic module 118, or alternatively, may be integrated with the electronic module 118.

Figure 2:
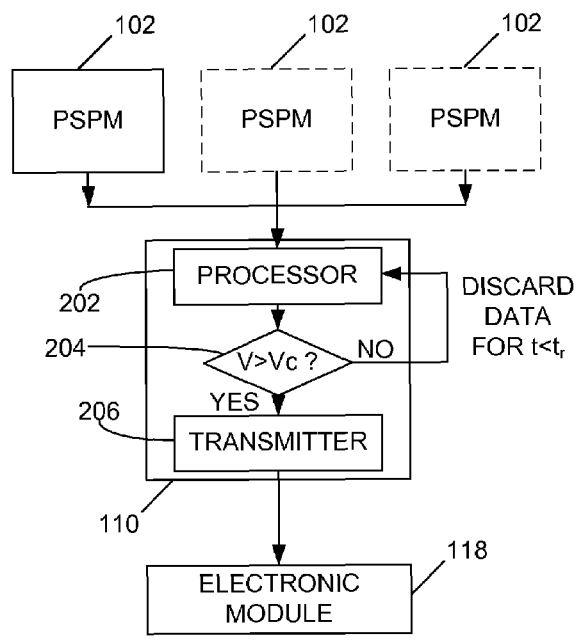
FIG. 2 is a block diagram of one or more sensing elements of a tire pressure measurement system connected to a processor in accordance with the invention.

One embodiment for connection and operation of a tire pressure monitoring system is shown in FIG. 2. One or more PSPG sensors 102 may be used for a single tire of a vehicle. If more than one PSPM 102 sensors are used, they may be placed in symmetric locations around a periphery of the tire. for example, if two PSPG 102 sensors are used, they may be placed 180 degrees apart on the inner curved surface of the tire. All PSPG 102 sensors used for a single tire may each have their own P/T 110 module connected to them, as shown in FIG. 1, or may alternatively share a common P/T 110 module as shown in FIG. 2. In any case, the P/T device 100 may include a processor component 202, which may be used to discriminate faulty data according to a comparator component 204, and a transmitter component 206. The P/T device 110 may also include a temperature sensor integrated therein as described above. Information from each of the sensors 102 is arranged to reach the processor component 202. The processor component 202 may process the information from each of the sensors 102 and output a value, V, to the comparator component 204. The comparator component 204 may compare the value V to a cutoff value, $V_c$. The cutoff value $V_c$ may be a predetermined value or threshold, and may depend on the type, application, and/or other various operating parameters of the tire and/or the vehicle having the pressure monitoring system employed.

When the comparator module 204 determines that the value V is equal to or below the cutoff value $V_c$, the value is discarded for a period of time, t, which is less than a predetermined period for rejection, $t_r$. When the comparator module 204 determines that the value V is greater than the cutoff value $V_c$, the value V is communicated to the transmitter component 206. The electronic module 118 can advantageously receive the information from the transmitter component 206 as described above.

Each of the one or more PSPG 102 sensors shown in FIG. 2 may advantageously be installed on a single tire. Use of more than one sensors 102 per tire of a vehicle is advantageous for various reasons that include independent and direct pressure monitoring, double blind test capability for onset of tire failure warning through double redundancy of sensing elements, and in the case where three sensors are used, double blind test for error discrimination capability among each sensor's 102 output, in-situ and triple redundant measurement capability of wheel speed in addition to tire pressure, in-situ tire temperature measurement capability, and others. Moreover, appropriate software may be used in the processor 202 to distinguish between false positive information on tire failure that may be caused by an uneven road surface (e.g. bumps on the road) and a true tire failure.

Figure 3:
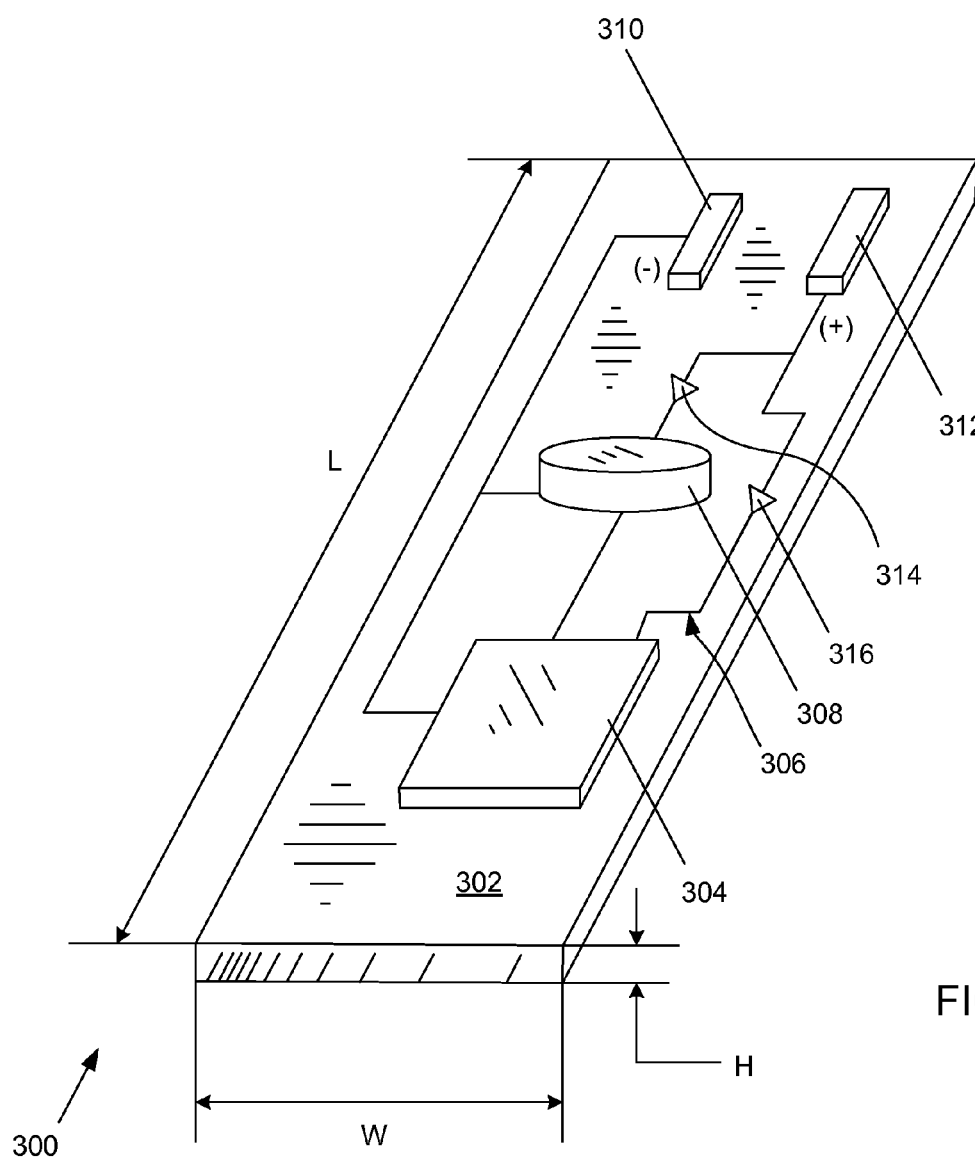
FIG. 3 is an outline view of a tire pressure measurement device in accordance with the invention.

One embodiment for a tire pressure sensing apparatus (TPSA) 300 is shown in FIG. 3. The TPSA 300 includes a piezoelectric composite layer (PCL) 302. An integrated circuit (IC) component 304 that is capable of processing information, transmitting information using a radio frequency (RF) and/or microwave frequency, and sensing temperature, or, a component performing some of the functions of the P/T 110 device described above, may be connected to the PCL 302. The IC component 304 may be electrically connected to other components via a plurality of metalized connection conduits 306. A power storage device 308 may be connected to the IC component 304 and to a negative electrode or terminal 310. A positive electrode or terminal 312 may be connected to the power storage device 308 through a first rectifier 314, and may be connected to the IC component 304 through a second rectifier 316. An appropriate rechargeable battery or capacitor may be selected for the power storage device 308. In the case when no power storage device 308 is used, the first rectifier 314 may be omitted as well.

The PCL 302 may advantageously have a three-dimensional rectangular shape, having a length, L, a width, W, and a height, H. The length may advantageously be 20-150 mm, the width may be about 10-90 mm, and the height may be about 1-10 mm, although other sizes may be used. Proper dimensions for the PCL 302 may be determined based on a size and type of a tire the PCL 302 will be used on. Optimization of the dimensions selected for the PCL 302 used on a tire may involve an accounting for the tire's diameter and width, including tire thread design, as well as tire thread pattern as appropriate.

The PCL 302 may advantageously use a piezoelectric fiber composite or, a piezoelectric (2-2) composite. Such applications of piezoelectric composite structures, in general, are known. The following references that are incorporated herein in their entirety by reference may be viewed as examples of methods of use and manufacture of piezoelectric composite materials: (1) Kampe et al. in United States Patent Application publication number US 2005/0073222 A1, published on Apr. 7, 2005, disclose a piezoelectric ceramic-reinforced metal matrix composite. (2) Cui et al. in U.S. Pat. No. 5,951,908, published on Sep. 14, 1999, disclose Piezoelectrics and related devices from ceramics dispersed in polymers. (3) Cui et al. in U.S. Pat. No. 5,702,629, published on Dec. 30, 1997, disclose Piezoelectric ceramic-polymer composites, and (4) Schmidt et al. in U.S. Pat. No. 6,262,517, published on Jul. 17, 2001, disclose a pressure resistant piezoelectric acoustic sensor. Finally, (5) Wilkie et al. in U.S. Pat. No. 6,629,341, published on Oct. 7, 2003 and assigned to the National Aeronautics and Space Administration (NASA), disclose a method for fabricating a piezoelectric macro-fiber composite actuator that includes a piezoelectric material that has two sides, and attaching one side upon an adhesive backing sheet.

An expanded view of one configuration for the PCL 302 is shown in FIG. 4. The PCL 302 includes a first functional layer 402, a sensing layer 404, and a second functional layer 406. The functional layer 402 includes a substrate layer 408 attached thereunder. The substrate layer 408 may be substantially flat, having a fist face or surface 410 and an opposing face 412. The first face 410 may have two pluralities, a first 414, and a second 416, of screen-printed inter-digitated electrodes printed thereon. The first plurality of electrodes 414 and the second plurality of electrodes 416 may advantageously create a voltage difference between them during operation of the PCL 302. The opposing face 412 may have a polymer or epoxy layer 418 deposited thereon, the layer 418 having a substantially uniform thickness.

The sensing layer 404 may include a series of bundled piezoelectric fiber or piezoelectric ribbon (a (2-2) composite configuration as is known in the art, for example) sensing elements 420, connected to each other by a series of epoxy connecting layers 422. Each sensing element 420 may advantageously be made of a piezoelectric ceramic structure, such as PZT, PMN-PT and others known in the art. Each epoxy connecting layer 422 may have a uniform thickness and height along the length of the sensing layer 404. The second functional layer 406 may be arranged and be similar in construction to the first functional layer 402. The layer 406 may include a substrate layer 424. The substrate 424 may have screen-printed indigitated electrodes 426 printed thereon. The electrodes 426 and a second plurality of electrodes 428 advantageously create a voltage difference between them during operation of the PCL 302 that is caused by deflections in the sensing layer 404. An opposing face 430 of the substrate 424 may have an epoxy layer 432 deposited thereon, the epoxy layer 432 having a substantially uniform thickness.

A cross-sectional view along a section A-A of FIG. 4 is shown in FIG. 5. One plurality of electrodes, the electrodes 426, is shown for example, and the other electrodes, 428, 416, and 414 may advantageously be configured in a similar fashion. The electrodes 426 include a surface conduit section 434 that is electrically connected to a sensing conduit section 436. The section 436 is electrically in contact with at least one sensing element 420 in at least one location along it's length. Electrical impulses generated by the at least one sensing element 420 during operation of the PCL 302 may be accumulated by each of the sections 436, and transferred to the surface conduit section 434 to form an output impulse of information for the plurality of electrodes 426. The remaining electrodes, 428, 416, and 414, may be configured similarly and may aggregate electrical impulse information from all of the sensing elements of the PCL 302. Notably, the layers of epoxy 418, 422, and 432 may be used for electrical insulation, as well as for structural flexibility and support for adjacent components of the PCL 302. The PCL 302 may advantageously also be encased in a protective layer 440. The layer 440 may completely or partially encapsulate the PCL 302 to protect it from humidity and debris, and may be made of an epoxy, elastomeric, or other appropriate material. The PCL 302 may advantageously be adhered to an inner race of an outer periphery of a tire to enable deformation of the PCL 302, and thus a voltage reading, while the tire rotates. Alternatively, the PCL 302 may be molded into a material making up an outer periphery of a tire for a more permanent installation.

Figures 6A, 6B, 6C:
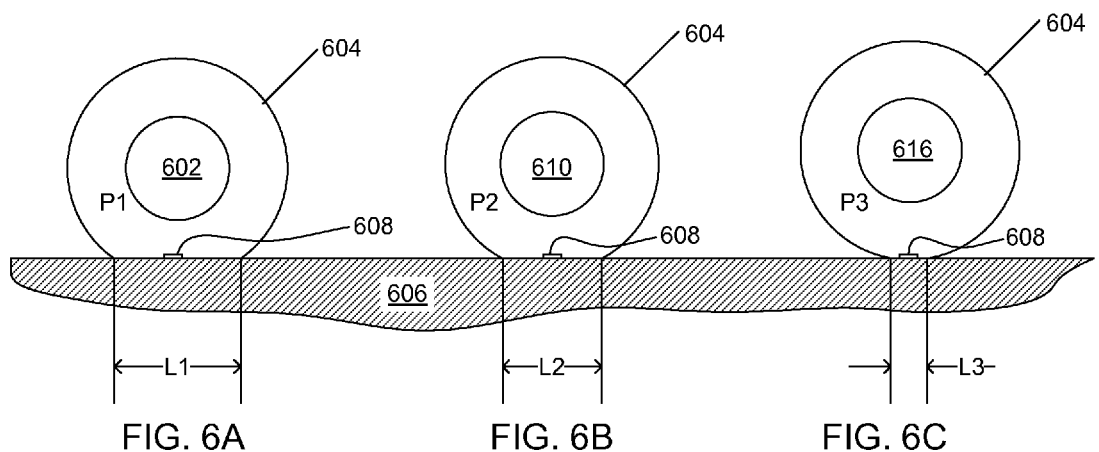
FIGS. 6A-6C are side cross sectional views of tires under different inflation conditions having at least one tire pressure measurement devices attached thereon in accordance with the invention.
Figures 7A, 7B, 7C:
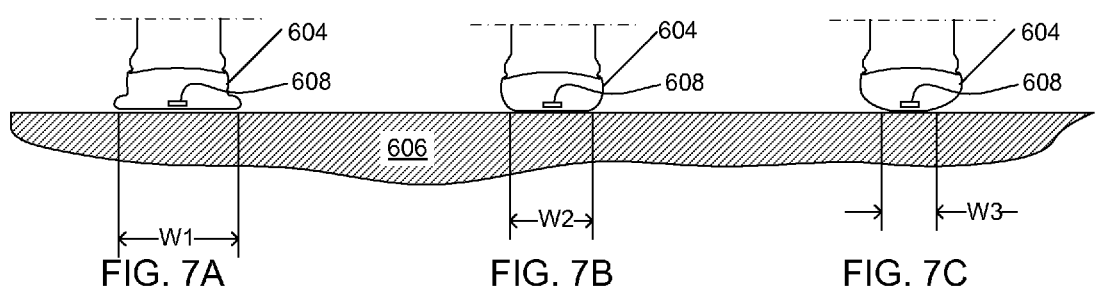
FIGS. 7A-7C are front cross sectional views of tires under different inflation conditions having at least one tire pressure measurement devices attached thereon in accordance with the invention.

A wheel 602 having a tire 604 connected thereto, is shown in various conditions of inflation in FIGS. 6A-6C on a side cross sectional perspective, and in FIGS. 7A-7C from a front cross sectional perspective. Each wheel 602 in the aforementioned figures is shown on a surface 606 during operation. The wheel 602 is shown in an under inflated condition in FIGS. 6A and 7A, a nominally inflated condition in FIGS. 6B and 7B, and in an over-inflated condition in FIGS. 6C and 7C. The tire 604 may have a pressure sensor 608 connected to an outer peripheral surface on an inside track of the tire, or alternatively, embedded into a material making up the tire. The wheel 602 may have a contact surface with the road surface 606 that has, if approximated as a rectangle for the sake of simplicity, a length, L1, and a width, W1, when under-inflated at a pressure, P1; a length, L2, and a width, W2, when inflated at a nominal pressure, P2; and a length, L3, with a width, W3, when over-inflated at a pressure, P3. The embodiments shown in FIGS. 6A through 7C are shown for a same load F for illustration of tire surface areas of contact for the various conditions of inflation.

When the wheel 602 is in operation, a flexural strain in the material patch of the tire 604 that is contacting the road surface 606 is present over the entire length of each of the length L1, L2, or L3. The sensor 608 may sense the flexural strain for a time (depending on the speed of the wheel 602), t, that may be relatively longer for a pressure P1, or shorter for a pressure P3 than that for a nominal pressure P2. Moreover, a magnitude of a reading of the sensor 608 will change, increasing or decreasing from a nominal condition of inflation for the tire 604, partly due to lateral deflection that leads to a larger width W1 for a pressure P1, or a smaller deflection or width W3 for a pressure P3, with respect to a nominal width W2 for a nominal pressure P2.

In general, a voltage generated by the sensor 608 is directly related to an inflation pressure of the tire. The lower the tire pressure, the greater the contact area of the tire with the road surface, and consequently the greater the flexural strain on sensing element. Ultimately, the greater the flexural strength, the higher the voltage generated by the sensor. Hence, the lower the tire pressure, the higher the voltage generated by the sensor. The width of the pulse detected regardless of the magnitude of the voltage generated, is related to the time spent by the contact surface with the road surface. Hence, the width of the detected pulse is related to the tire's speed at a given tire pressure.

Figures 8, 9:
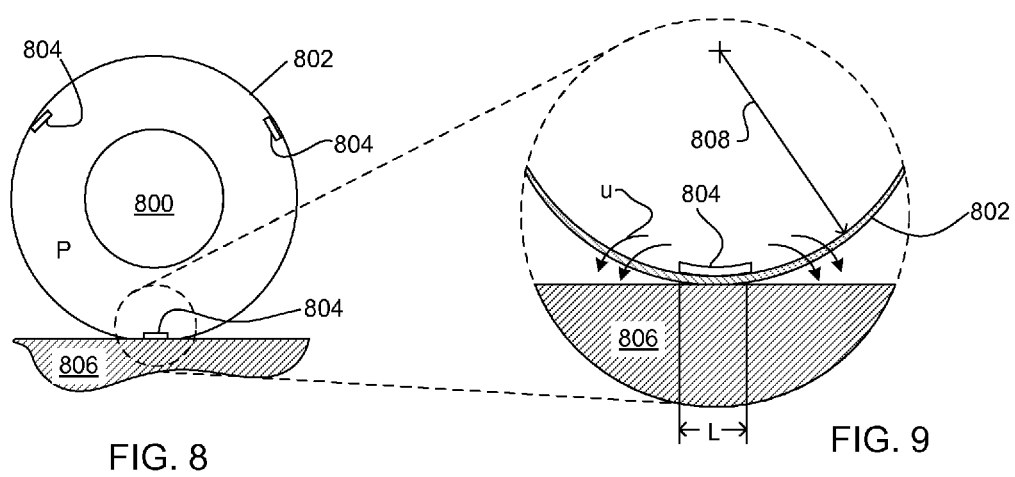
FIG. 8 is a side cross sectional view of a tire having three tire pressure measurement devices symmetrically attached thereon in accordance with the invention.
FIG. 9 is a detail cross sectional view of a contact area between the tire of FIG. 8 and a road surface showing a direction of flexural strains measured by the tire pressure measurement device in accordance with the invention.

A wheel 800 is shown in partial cross-section in FIG. 8. The wheel 800 has a tire 802 attached thereon. A plurality of sensors 804 in accordance with the invention are connected to the tire 802. In the embodiment shown, the plurality of sensors 804 includes one or more sensors symmetrically spaced around an outer periphery of the tire 802, but specialized applications may use additional sensors for redundancy (e.g. military or aerospace applications). Even though three (3) sensors 804 are shown, the same principles will apply in cases where less or more than three sensors are used. The tire 802 is in contact with a road surface 806.

A detail view of the contact area between the tire 802 and the road surface 806 is shown in FIG. 9. One of the plurality of sensors 804 is shown in a position where the tire 802 is contacting the road surface over a length, L. When tire 802 contacts the road surface 806, a deflection of a portion of the tire 802 causes a flexural strain, T, in a downward direction arcuately toward the road surface 806 as denoted by the arrows. A magnitude of the flexural strain, u, is proportional to the length L, and it is the flexural strain u that is sensed by the sensor 804. A work done on the sensor 804 by the flexural strain is inversely proportional to the pressure in the tire, and also, to the rigidity of the road surface. The sensor 804 may develop a voltage output that may be proportional to the flexural strain u.

Under normal road surface conditions, for example when a vehicle is traveling on dry and hard pavement, an output of the sensor 804 as part of a TPMS system may be used to interpret an inflation condition of the tire 802. Alternatively, if an inflation condition of the tire 802 is assumed or acquired as an initial reading when the vehicle is stationary, an output of the sensor 804 may be advantageously used to infer a condition of the road surface, the condition including attributes of the road surface such as rigidity (e.g. snow or mud conditions), traction, and so forth.

A voltage generated by a piezoelectric sensor may be a function of various constants that are related to the piezoelectric composite used, the so-called form factor of the sensor itself, and various other operating parameters, such as, tire pressure, time, and temperature, as given below:

$$V(T,P,t) = (z/A)\{d/K\}F(P,T,t)$$

where V is the voltage generated by the sensor, T is operating temperature for the sensor, P is an inflation pressure of a tire the sensor is installed in, t is the time of flexuring the sensor due to a rotation of the tire, z is a characteristic thickness of a sensor transducer, A is a characteristic area of the transducer, d is a piezo-charge coefficient of the transducer, K is a permittivity coefficient of the transducer, and F is a flexural force or stimulus experienced by the transducer, the force F being a function of P, T, and t, as described above. During operation of the sensor, a ratio of V/F could be equal to a transfer function that may be normalized for the temperature T, the transfer function being equal to:

$$\frac{V(T, P, t)}{F(T, P, t)} = C(T) = (z/A)[d(T)/K(T)]$$

The piezo-charge coefficient d and the permittivity coefficient K of the transducer are material characteristics and may change as a function of temperature. Temperature compensation of such parameters may advantageously be used through use of a temperature sensor on the P/T unit, in conjunction with the control algorithm that will be programmed into the P/T unit.

Figure 10:
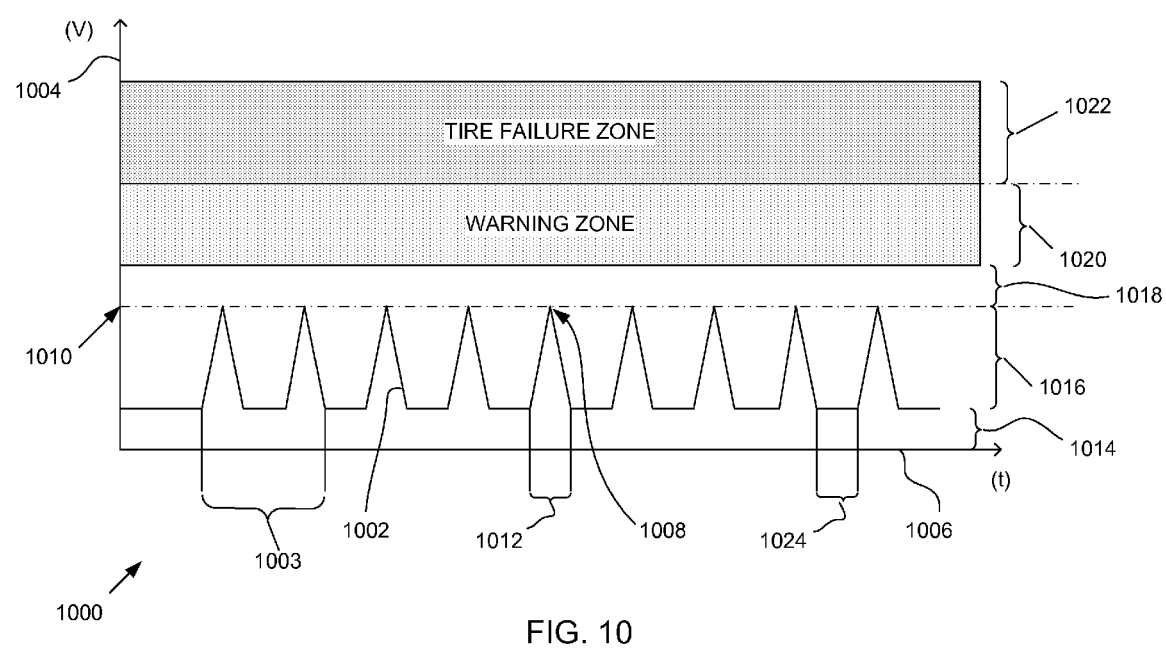
FIG. 10 is a graph showing measured voltage spikes versus time and various voltage thresholds associated therewith in accordance with the invention.

A graph depicting a typical output signal of a sensor in accordance with the invention as installed in a wheel of a vehicle in operation, expressed in output voltage (V) over time (t) is shown in FIG. 10. A graph 1000 depicts an exemplary time trace of a sensor output during operation. A trace signal 1002 is plotted against a vertical axis 1004 that represents a voltage output value from the sensor, and a horizontal axis 1006 that represents time. The trace signal 1002 may exhibit a plurality of spikes 1008, as shown. Each spike 1008 may have a peak value 1010 and be present for a time 1012. The time trace 1002 may have a "zero" voltage value that is offset by an offset 1014 from a true zero voltage value. A normal operating range 1016 may include almost all points of the time trace 1002 during normal operation of a sensor. A buffer zone 1018 may cover voltage values that are just above the normal operating range 1016. A warning zone 1020 may exist for certain voltage values lying above the buffer zone 1018, and a failure zone 1022 may lie adjacent to and cover voltage values above those of the warning zone 1020.

The time trace 1002 may be generated by a sensor connected to an outer periphery of a tire, in accordance with the description above. In a situation when the tire containing the sensor is attached to a wheel of a moving vehicle, a time trace similar to the time trace 1002 may be captured and monitored by an on-board calculation device. Such a calculation device, in some instances, may advantageously be used to also compensate for altitude variations during vehicle service that might affect a sensed inflation pressure of a tire. A time trace for each individual sensor used on a vehicle may be monitored separately, or, multiple sensor signals from a same wheel may be monitored simultaneously. If a plurality of sensors are located in symmetrical locations on a tire, and their signals are monitored simultaneously, then the time trace acquired might also have a periodic character, like the time trace 1002 shown in FIG. 10. Each sensor may yield a set of spikes 1003 representing a contact event of a tire with the road surface in the vicinity of the sensor. A first and a second spike temporally in the set 1003 represent a deformation of the tire in an area before and after the sensor with the road surface as the tire rotates. A time-period between sets 1003 of the pulses or spikes 1008 may represent a portion of a wheel's rotation where a non-sensor portion of the tire is contacting a road surface. When a portion of the tire having a sensor connected thereon is contacting a road surface, then that sensor may emit a signal representing a rising flexural strain as the sensor senses a deformation of a portion of the tire approaching contact with the road surface, and a declining flexural strain as the sensor senses a deformation of a portion of the tire leaving from a contact with the road surface, yielding two spikes per sensor for every contact event of contact of the tire with the road surface in the vicinity of the sensor per revolution of a wheel.

Each of the time-periods 1012 and 1024 that represent a tire deformation during and between contact with the road surface depends on a vehicle velocity. In the case when only one sensor may be used per tire, the time 1024 will be proportionately larger than the one shown, and two consecutive spikes in the trace may represent one complete rotation of a wheel. Similarly, if two sensors are used, there might be four spikes for each rotation of the wheel, and so forth.

Under normal operating conditions, the time trace 1002 will be expected to remain within the normal operating range 1018. Because of the wireless mode used for information communication between tire sensors and the controller on the vehicle, some allowance for noise is made, meaning, some spikes 1008 may register a higher than normal value that is within the buffer zone 1018, but these instances may be isolated and random, and are not intended to trigger any warning mechanisms in the controller, or any notifications for an operator of the vehicle. Moreover, noise may be introduced by variations in the road surface during operation, for example, bumps or pot-holes encountered by the tire, and others. Nevertheless, if there indeed is cause for alarm, for example, of a tire inflation pressure is non-constant and declining then the spikes 1008 may begin to creep higher in a consistent fashion.

The warning zone 1020 and the tire failure zone 1022 may be determined based on an expected loss of tire inflation pressure P during operation of the vehicle. An expected loss of inflation pressure that may be considered as a tire failure may be a predetermined loss of pressure, or, it may advantageously be based on the loading condition of the vehicle. For example, a percentage of pressure loss that is allowable may be based on an initial reading, when the vehicle is not loaded, divided by a subsequent reading, when the vehicle is loaded, to provide a baseline, or, a 100% nominal value. subsequent measurements during operation of the vehicle may be performed and compared to the baseline value to yield a percentage difference between the baseline value and each of the measured values. A lookup table, as is known, may be used to compare any inflation pressure differences and determine a suitable threshold value based on the loading condition of the vehicle.

Based on properly set failure zone thresholds, a warning to the operator of the vehicle may be issued when the spikes 1008 enter into the warning zone 1020 with the passage of time. As a pressure decreases in a tire, a flexural strain and therefore an output voltage of a sensor will increase. Similarly, a tire failure may increase the output of a sensor connected to that tire that will yield a time trace 1002 spike 1008 that is high enough to enter the tire failure zone 1022.

Figure 11:
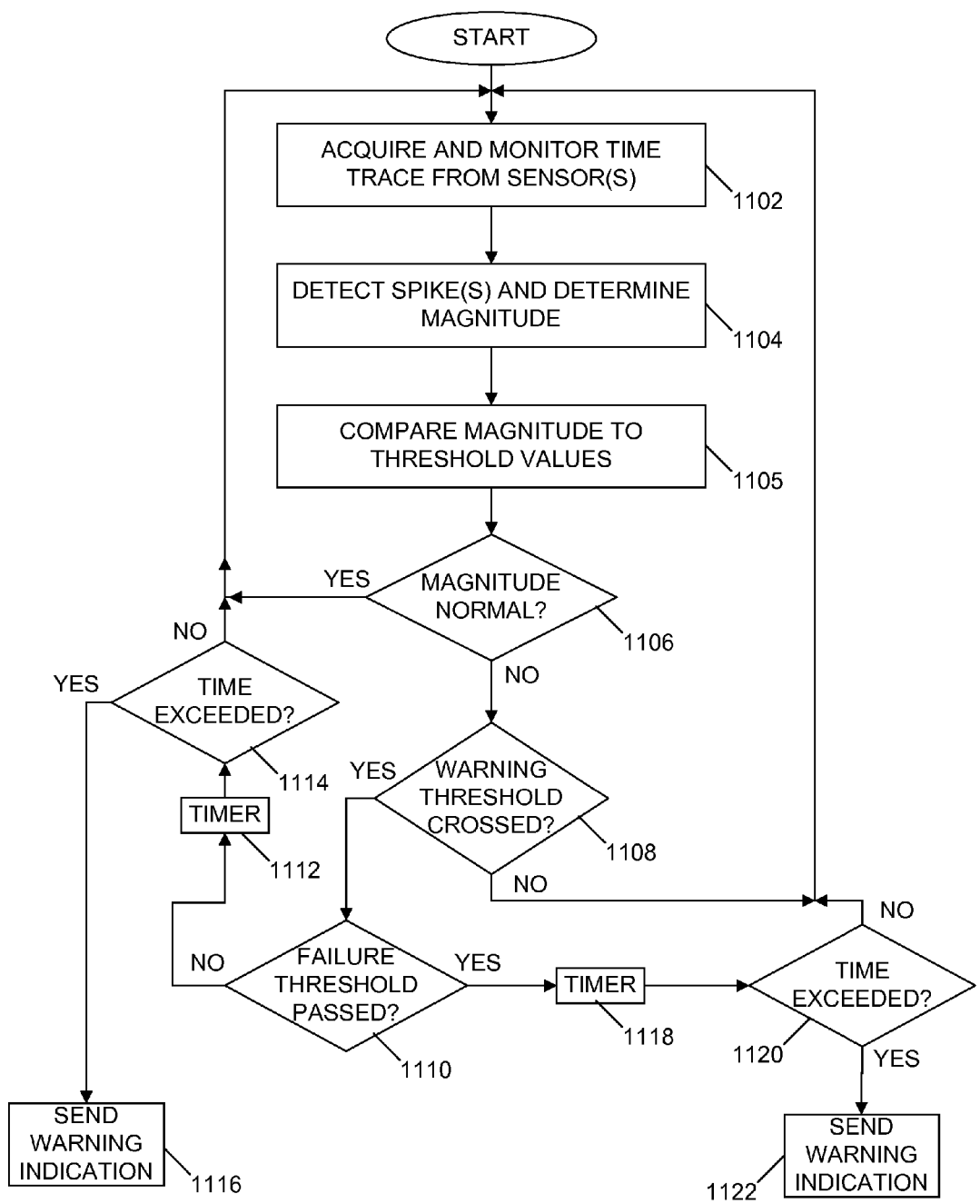
FIG. 11 is a flowchart for a method in accordance with the invention.

A P/T device in service on a vehicle tire may be configured to monitor at least one time trace. A flowchart for a method of generating a warning about a condition of at least one wheel on a vehicle during operation is shown in FIG. 11. The device may acquire and monitor at least one time trace signal from a sensor in step 1102. The signal acquired may be analyzed to detect many different operating parameters, for example, road condition, traction of the wheel on a surface, an inflation pressure of the wheel, a loading condition, a loading distribution of the vehicle, and so forth. In one embodiment, the device may detect spikes or inflection points in the time trace, and measure a magnitude of a spike in step 1104.

The magnitude of the spike measured may be compared to threshold values step 1105, which may include comparison to a normal maximum value at step 1106, a buffer threshold, a warning threshold at step 1108, and/or a failure threshold at step 1110.

If the spike magnitude falls within a normal operating range, then an affirmative output may be generated from the decision block 1106, and the process may be repeated starting again at step 1102 for a subsequent measured spike. If a negative decision is output from decision block 1106, in a case when a spike magnitude falls beyond an acceptable range, then the process continues with decision block 1108 where comparison of the magnitude to a warning threshold value is made.

If the warning threshold is exceeded in step 1108, a positive output from decision block 1108 takes the process to a determination of whether the magnitude exceeds a failure threshold at decision block 1110. If the warning threshold is not exceeded, then the output of decision block 1108 will be negative, indicating that the magnitude of the spike falls within the buffer zone, and the process is repeated for a subsequently measured spike with step 1102. If the output of the decision block 1110 is negative, meaning that a warning condition and not a failure condition exists, the output of decision block 1110 will be negative. In this case, a sub-module may be activated to determine whether the exceeding of the warning threshold is present for a determinable time. A timer is activated in step 1112 and a decision block 1114 monitors a time that the timer is active to avoid false positive determinations. If the timer is active for longer than the predetermined time, then an output of the decision block 1114 will be positive and a signal will be sent indicating the presence of a warning condition in step 1116. This indication may be sent to a vehicle electronic control unit (ECU) as described above, and may advantageously be used to instigate any type of operator warning indication known, for example, an illumination of a message indicator on a dashboard of the vehicle, a wireless transmission to a remote control station using cellular band or radio band frequencies, and so forth.

If the failure threshold is exceeded in step 1110, a positive output from decision block 1110 a sub-module may be activated to determine whether the exceeding of the failure threshold is present for a determinable time. A timer is activated in step 1118 and a decision block 1120 monitors a time that the timer is active to avoid false positive determinations. If the timer is active for longer than the predetermined time, then an output of the decision block 1120 will be positive and a signal will be sent indicating the presence of a failure condition in step 1122. This indication may be a wireless transmission to a vehicle's ECU (see comment on previous page), which in turn may, for example, notify a vehicle operation of the condition by providing an illumination of a message indicator on a dashboard of the vehicle, a wireless transmission to a remote control station using cellular band or radio band frequencies, and so forth, and/or may include a failure mitigation measure if the failure is deemed critical to the operation of the vehicle, for example, if a wheel responsible for steering is affected, or, if multiple wheels on a same side of the vehicle are affected and control of the vehicle is compromised. Examples of possible mitigation measures may include passive measures, such as activating the hazard lights of a vehicle or activating the vehicle's headlights, or active measures, for example, limiting a maximum speed attainable by the vehicle by reducing the maximum allowable travel on the vehicle's engine throttle, limiting the engine's fuel delivery rate, and so forth.

Figure 12:
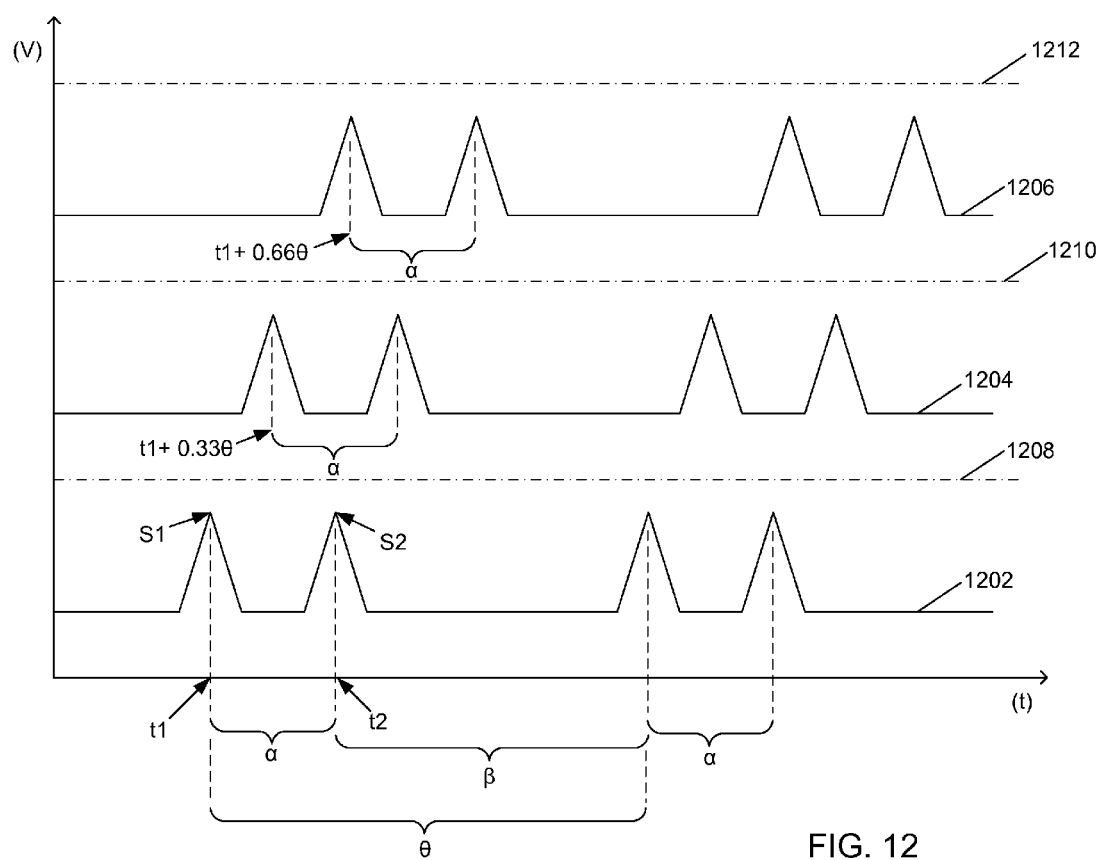
FIG. 12 is a graph showing various time traces of voltage versus time for sensors in accordance with the invention.

One advantage of the embodiments described herein is the capability of conducting a tire failure test, and/or a vehicle velocity test, with error discrimination and triple redundancy by use of a single or multiple sensors. A graph showing time traces acquired by a controller for three sensors connected to a wheel for a vehicle is shown in FIG. 12. This graph has a voltage, V, plotted on the vertical axis and time, t, plotted on the horizontal axis, and shows a first time trace 1202 corresponding to a first sensor, a second time trace 1204 corresponding to a second sensor, and a third time trace 1206 corresponding to a third sensor. Each of the time traces 1202, 1204, and 1206, may have an associated warning threshold associated therewith, shown as dotted lines 1208, 1210, and 1212 respectively, that may be similar in magnitude, or, may depend on a particular loading condition of each tire should multiple sensors are used on different tires.

As it can be seen from the graph in FIG. 12, each sensed event, defined as an event of a section of a tire having a sensor disposed thereon meets a road surface, may exhibit a pair of spikes. For example, the trace 1202 for the first sensor has a spike, S1, at a time, t1, when the section of the tire enters its contact with the road surface, and a second spike, S2, at a time t2, as the section of the tire leaves from contact with the road surface. A time, $\alpha$, between the spikes S1 and S2 represents a time when the section of the tire with the sensor attached thereon is in contact with the road surface.

A time, $\beta$, may be a time between pairs of spikes and represent a time during which a section of the tire that does not contain a sensor contacting the road surface. A time, $\theta$, between each first spike on the first trace 1202 may represent a period of rotation of the tire containing the first sensor. In the case shown and described herein, there are three sensors placed on a single tire. One with ordinary skill in the art will realize that any analysis involving a different number of sensors per tire will work in a similar fashion, with certain parameters changed accordingly.

The second trace 1204 that represents spikes generated by the second sensor may be offset by a phase difference of $0.33\theta$ with respect to the spikes in the first time trace 1202, and similarly, the third time trace 1206 that represents spikes generated by the third sensor may of offset by a phase difference of $0.66\theta$ with respect to the spikes in the first time trace 1202 if the first, second, and third sensors are placed symmetrically around a periphery of the tire.

Such parameters may enable the calculation of one or more parameters pertaining to the operation of a single tire, or multiple tires during operation of a vehicle, that include a calculations on the speed of the vehicle, rotational speeds for each individual tire to infer slippage, and so forth. Alternatively or in addition to these calculations, the multiplicity of sensor inputs may advantageously be used for error discrimination on the information acquired for each tire.

Figure 13:
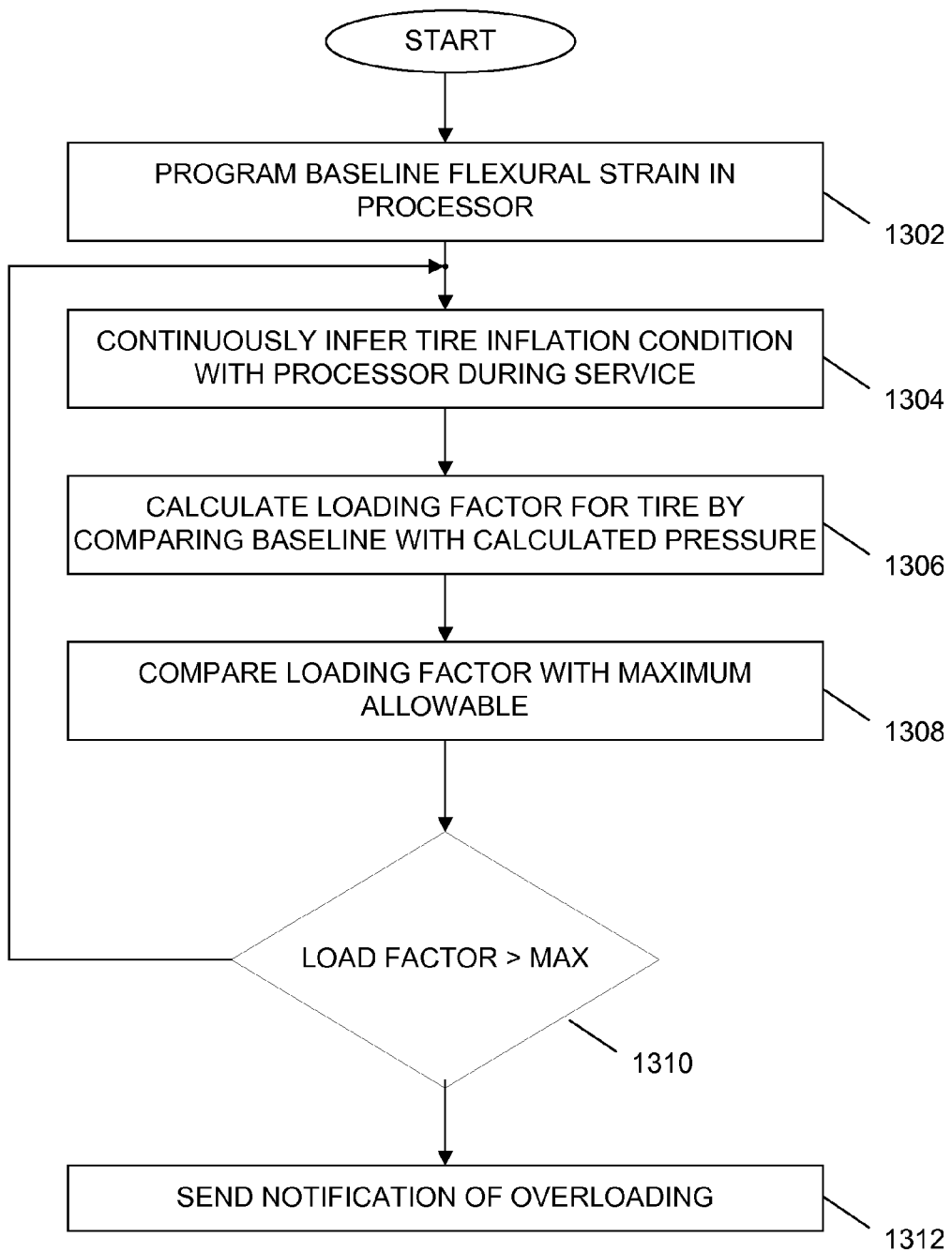
FIG. 13 is a flowchart for a method in accordance with the invention.

There may be many applications that may benefit from some of the embodiments described herein, for example, a method for vehicle over-weight detection and protection. A flowchart for a method of detecting an overweight condition by using a tire monitoring system as described herein is shown in FIG. 13. A baseline flexural strain for a tire is programmed into a memory location of a processor at step 1302. This baseline flexural strain may be translated into a voltage spike, and therefore a baseline pressure representing a nominal tire inflation of a tire as installed on an unloaded vehicle. This baseline pressure may be acquired by the processor when in a "programming" mode while still in an assembly plant, or digitally stored into the processor as a known reference value, and so forth. This baseline value may be assigned a minimum (MIN) value for diagnostic purposes during service of the sensor.

The processor may continuously monitor an inferred inflation condition of the tire during service at step 1304. This monitoring function may include successive acquisitions of voltage readings from a sensor. Each of these readings may be used to infer an inflation pressure of the tire and a comparison between each of the inferred pressures with the baseline or MIN known pressure. A difference between each calculated pressure and the MIN value may yield a loading factor at step 1306. The loading factor may be looked up and/or compared with a maximum allowable loaded condition (MAX) at step 1308. The MAX condition may be a value representing an expected voltage reading that has been pre-programmed into the processor, for example, by the tire or sensor manufacturer. The MAX condition may also advantageously be dependent on the load of the vehicle, for example, a lower allowance for inflation pressure loss or load variation may be acceptable for a vehicle carrying a larger load.

A determination may be made at step 1310 of whether the loading factor exceeds the MAX condition, and a notification may be sent wirelessly to an electronic module at step 1312 at times when it is determined that the loading condition exceeds the MAX allowable value.

The notification of step 1312 may be sent directly to an ECU of a vehicle, or may alternatively be sent to a receiving station that is arranged to receive such notifications, for example, a receiver incorporated in a toll booth, a truck weigh station, and so forth. This capability for wireless transmission may advantageously be used by a highway authority to be aware of an overweight condition of a truck using a highway without requiring an inspection or weighing of the truck on a scale, and enable the authority to issue a fine for an overweight violation to the owner or operator of the truck.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A tire monitor, comprising:
a first device that includes:
at least one piezoelectric matrix element, and
a first sensing layer, comprising:
at least one rectifier,
a second rectifier operably connected to the piezoelectric matrix element,
a processor element, and
a power storage device operably connected to the processor element,
wherein the second rectifier is disposed between the processor element and the power storage device;
wherein the first device is capable of sensing a deflection in a layer of material, wherein the first device is capable of processing the sensed deflection, and wherein the first device is capable of wirelessly transmitting an indication on a condition of the material.

2. The tire monitor of claim 1, wherein the first device is disposed on an inner peripheral surface of a tire.

3. The tire monitor of claim 1, wherein the first device is disposed on an inner peripheral surface of a tire, wherein the tire monitor further comprises a second device, and wherein the second device includes:
at least one additional piezoelectric matrix element,
at least one additional rectifier, and an additional processor element, wherein the second device is capable of sensing a deflection in a layer of material,
wherein the second device is capable of processing the sensed deflection, and wherein the second device is capable of wirelessly transmitting an indication on a condition of the material.

4. The tire monitor of claim 1, further comprising an electrical ground operably connected to the piezoelectric matrix and the processor element.

5. The tire monitor of claim 1, wherein the first device further comprises a second sensing layer, wherein the piezoelectric matrix element is disposed between the first sensing layer and the second sensing layer.

6. The tire monitor of claim 1, further comprising a temperature sensing element, wherein the temperature sensing element is at least one of disposed on the first sensing layer and integrated with the processor element.

7. The tire monitor of claim 1, further comprising an encapsulation layer disposed around the first sensing element.

8. A method of monitoring a tire, comprising the steps of:
sensing a flexural strain in a layer of material with a piezoelectric matrix;
generating a spike of voltage once during a rotation of a tire with a sensor;
detecting the spike of voltage and determining a magnitude thereof;
comparing the magnitude to at least one of a warning threshold and a failure threshold;
sending a warning indication when the magnitude exceeds the warning threshold.

9. The method of claim 8, wherein the step of generating a spike is accomplished by use of a piezoelectric matrix that is disposed between two sensing layers, wherein each of the two sensing layers includes a processor, and wherein each processor is capable of communicating wirelessly with an electronic module that is operably associated with a vehicle.

10. The method of claim 8, further comprising the step of initiating a timer when the magnitude exceeds at least one of the warning threshold and the failure threshold.

11. The method of claim 8, wherein the flexural strain generates a voltage across the piezoelectric matrix.

12. The method of claim 11, further comprising the step of relaying the voltage to a processor element, wherein the steps of detecting, determining, comparing, and sending are accomplished in the processor element.

13. The method of claim 11, further comprising the step of using the voltage to deposit an incremental amount of electrical power into a power storage device, wherein the power storage device is connected to the piezoelectric matrix through a rectifier.

14. A method of sensing an inflation condition of a tire, comprising the steps of:
operably attaching at least one device on an inner periphery of a tire, wherein the at least one device is capable of generating a voltage based on a flexural strain present in a section of material of the inner periphery of the tire;
wirelessly transmitting an indication of the inflation condition of the tire, by:
generating a spike voltage value based on the flexural strain,
comparing a magnitude of the spike voltage to a nominal value,
initiating a timer when the magnitude of the spike voltage exceeds the nominal value,
verifying the magnitude of the spike voltage from the at least one device by comparing said spike voltage to an additional a spike voltage from an additional device that is disposed on the tire,
activating a wireless transmitter, and
charging a power storage device that is disposed on the at least one device.

15. The method of claim 14, further comprising the step of correcting the magnitude based on a temperature, wherein the temperature is at least one of
generated by a temperature sensor that is disposed on the at least one device and
relayed to the at least one device externally.

16. The method of claim 14, wherein the wireless transmitter is capable of at least one of sending information to an electronic module and receiving information from the electronic module.

17. The method of claim 14, wherein the power storage device is at least one of a battery and a capacitor.

* * * * *